Feb. 9, 1932.  R. S. McNEIL ET AL  1,844,669
BASING VACUUM TUBES AND SIMILAR ARTICLES
Original Filed March 31, 1926
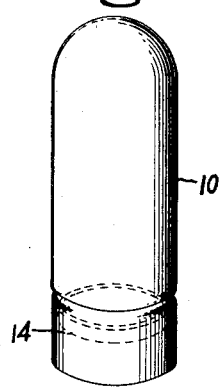
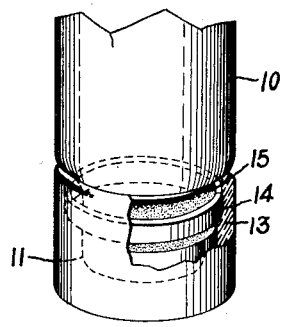
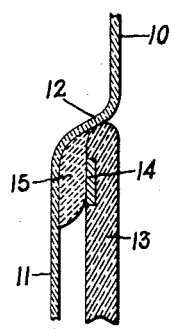
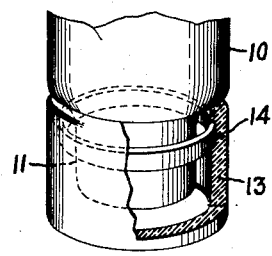
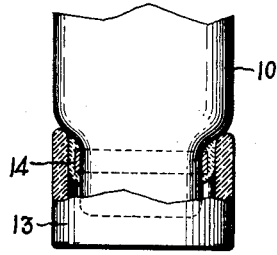
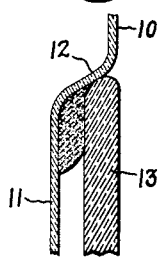
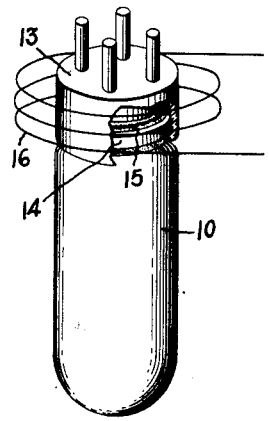
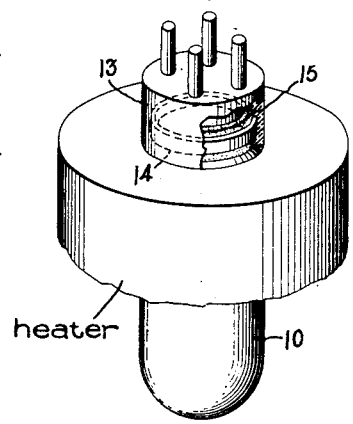
Inventors:
Roderick S. McNeil,
Emile V. Bitterli,
by Charles V. Mullan
Their Attorney.

Patented Feb. 9, 1932

1,844,669

UNITED STATES PATENT OFFICE

RODERICK S. McNEIL, OF NEWARK, NEW JERSEY, AND EMILE V. BITTERLI, OF PARIS, FRANCE, ASSIGNORS TO GENERAL ELECTRIC COMPANY, A CORPORATION OF NEW YORK

BASING VACUUM TUBES AND SIMILAR ARTICLES

Original application filed March 31, 1926, Serial No. 98,871. Divided and this application filed June 13, 1928. Serial No. 285,143.

Our invention reulates to the basing of vacuum tube electron discharge devices, incandescent lamps, and similar articles in which a base is cemented to a glass bulb, and more particularly to an improved base and method of securing it to bulbs.

A desirable base for vacuum tube electron discharge devices may be molded from a phenolic condensation product, such as bakelite or any other suitable material, in the form of a cup or ring. The rim of the cup or ring is preferably secured to the glass bulb by a comparatively narrow zone of basing cement hardened by baking at a temperature of several hundred degrees centigrade. Baking the basing cement by heating the exterior of such a molded base in the usual way is liable to injure the material of the base, which must be heated to a temperature higher than that necessary to bake the cement, as the base is a very poor conductor of heat. Basing cements which are modified in composition so as to harden at temperatures considerably lower than the standard basing cements are not satisfactory, and, therefore, the bases should be secured to the glass bulbs by means of the standard basing cements if possible.

One object of our invention is to provide a method of cementing bases of bakelite or other suitable material to glass bulbs by properly baked basing cement without injury to the base by high temperature.

Another object is to so localize and confine the heat for baking the basing cement to the immediate vicinity of the basing cement that only a very small part of the base is heated to the temperature at which the cement is baked.

A further object is to provide an improved molded base of bakelite and other suitable material which can be easily and economically cemented to a glass bulb without objectionable heating of the base. Still another object of our invention is in general to improve bases for vacuum tube electron discharge devices and the methods of securing bases to such tubes.

In accordance with our invention we firmly cement the base to the glass bulb by basing cement baked at the proper temperature and in intimate association with metal in the form of a body or ring or of powder or particles of metal embedded in or mixed with the cement. Where the metal is in the form of a body or ring it may be mechanically secured to the base, preferably by embedding the metal body or ring in the wall of the base near the rim, thereby incidentally reinforcing the base. The basing cement is properly baked by heat localized in the metal and the cement immediately adjoining it, so that the heat exerts a maximum effect upon the cement and quickly bakes it, but only a small part of the base itself is heated to the baking temperature, owing to the poor heat conductivity of the material of the base. In this manner we fasten to the bulb by properly baked basing cement a base or part thereof of which only a very small portion of the inner wall near the rim has been heated by conduction. The result is not only an improvement in basing, but also an improved vacuum device which has firmly secured to it by properly baked basing cement a base which has not been impaired or disfigured by being heated to high temperture during the basing operation.

Our invention will best be understood in connection with the accompanying drawings in which Figure 1 shows a vacuum tube having a base embodying our invention; Figure 2 is a view partly in section of the tube shown in Figure 1; Figure 3 is an enlarged cross-section, through a part of the wall of the base, the metal body, the basing cement and the wall of the bulb; Figure 4 is a view with a portion of the base broken away; Figure 5 is a view showing a modified base partly in longitudinal section; Figures 6 and 7 are sections showing modifications; while Figures 8 and 9 illustrate methods of heating the basing cement in the immediate vicinity of the metal body without objectionable heating of the wall of the base.

In the particular embodiment of our invention shown in the drawings a glass bulb 10, such as is commonly used in vacuum tube electron discharge devices, and preferably made with a cylindrical neck 11 and a shoulder 12, has secured to its neck a base 13 in the form of a cup, which may to advantage be made of a plastic material, such as bakelite, or other suitable materials, such as various plastics and ceramics. Such a base is substantially an insulator for both electricity and heat. A body of metal, preferably in the form of a ring 14 is located between the base and the neck of the bulb, and may be mechanically attached to the base, preferably by being embedded in it. For a base of the usual dimensions this ring may be made of metal, such as copper or iron about seven one-thousandths of an inch thick and one-eighth of an inch wide. The ring may conveniently be embedded in the wall of the base during the molding of the base, although it may be mechanically attached to the base in other ways, and in addition to its functions in the basing operation it also reinforces the rim of the base.

The base is cemented to the bulb by a thin layer of basing cement 15 between the bulb and the metal body 14. The cement may be spread in a thin layer on the metal ring 14 or may be applied to the neck of the bulb before the base is put down over it. The shoulder 12 on which the edge of the base rests when the base is in position on the neck positions the base accurately on the bulb.

To bake the cement it is heated in some way other than by exterior heating of the base 13 and conduction of heat through the base. In accordance with our invention the heat for baking the cement is localized and concentrated, preferably in the metal ring 14, which is in such an advantageous relation to the basing cement that the baking of the cement is accomplished before much heating of the wall of the base 13 occurs. A convenient way of localizing the heat in the metal ring and the adjoining cement is to develop heat in the metal or in the ring itself electrically as, for example, by placing a high frequency coil 16 over the base in inductive relation to the metal, as indicated in Figure 8, thereby inducing currents which will heat the metal to the proper temperature. This action is facilitated because the ring 14 forms a closed circuit. Another way of localizing the heat at the metal ring and the basing cement is, as indicated in Figure 9, to heat the glass of the bulb 10 immediately adjacent the edge of the base 14 but not the base itself, by a heater 17, the heat from which is conducted through the glass to the cement 15, and to the body of metal or ring 14, which tends to concentrate and localize the heat at the particularl point desired. By the methods just described the metal is raised to the proper temperature for baking the basing cement, yet the heat penetrates the wall of the base 13 only very slightly owing to the poor heat conductivity of the material of the base, consequently the rim of the base 13 retains practically all of its initial strength and the finish of the base is not impaired by the baking of the basing cement.

The ring 14 need not be embedded in the base, but may be coated with cement and placed between the wall of the base and the bulb, as shown in Figure 5, where the cement firmly joins the ring to the base and to the bulb. Other forms of metallic bodies may be embedded in or secured to the base, cement, or bulb, and the condition suitable for developing heat when the induction coil 16 is used may be obtained in other ways than by the use of a ring 14; for example, wire or a woven wire net may be used for the metal and may, if desired, be arranged to form a closed circuit; or particles of metal, such as metal powder, may be embedded in the cement, as indicated in Figure 6, or in the inner wall of the base to form a zone 18, as shown in Figure 7, in which heat will be generated by the high frequency coil.

Our invention is not restricted to vacuum tube electron discharge devices, but is applicable to any device in which a base or body of material of poor heat conductivity is to be cemented to another body by means of a cement hardened by heating, and our invention may be used to advantage in incandescent lamps and similar articles which have bases of material, such as bakelite, which is a poor heat conductor.

What we claim as new and desire to secure by Letters Patent of the United States, is:—

1. A cup shaped base of insulating material of poor heat conductivity having a metal ring mechanically secured to the inner wall of said base near its edge.

2. A cup shaped base of molded condensation material of poor heat conductivity having a metal ring embedded in its inner wall near its rim with its inner surface substantially flush with the inner wall of said base.

3. The combination of a glass bulb, a metal ring secured thereto by basing cement hardened by heating, and a base of material of poor heat conductivity mechanically attached to said ring.

4. A vacuum tube comprising a glass bulb, a metal ring secured thereto by baked basing cement, and a molded base of bakelite in which said metal ring is embedded near the rim to bring its inner surface immediately adjacent the bulb.

In witness whereof, I, RODERICK S. McNEIL, have hereunto set my hand this 16th day of April, 1928.

RODERICK S. McNEIL.

In witness whereof, I, EMILE V. BITTERLI, have hereunto set my hand.

EMILE V. BITTERLI.